(12) United States Patent
Nishio et al.

(10) Patent No.: US 11,142,098 B2
(45) Date of Patent: Oct. 12, 2021

(54) VEHICLE SEAT SLIDE APPARATUS

(71) Applicant: SHIROKI CORPORATION, Fujisawa (JP)

(72) Inventors: Takuya Nishio, Fujisawa (JP); Takanori Sato, Kariya (JP)

(73) Assignee: SHIROKI CORPORATION, Fujisawa (JP)

( * ) Notice: Subject to any disclaimer, the term of this patent is extended or adjusted under 35 U.S.C. 154(b) by 0 days.

(21) Appl. No.: 16/946,213

(22) Filed: Jun. 10, 2020

(65) Prior Publication Data

US 2020/0406786 A1 Dec. 31, 2020

(30) Foreign Application Priority Data

Jun. 26, 2019 (JP) .............................. JP2019-118991

(51) Int. Cl.
*B60N 2/00* (2006.01)
*B60N 2/08* (2006.01)

(52) U.S. Cl.
CPC ........... *B60N 2/0881* (2013.01); *B60N 2/085* (2013.01)

(58) Field of Classification Search
USPC ................................................. 248/424, 429
See application file for complete search history.

(56) References Cited

U.S. PATENT DOCUMENTS

| 10,391,893 | B2 * | 8/2019 | Goto ..................... | B60N 2/0825 |
| 10,406,942 | B2 * | 9/2019 | Kimura ................. | B60N 2/0715 |
| 10,471,852 | B2 * | 11/2019 | Taniguchi ............ | B60N 2/0825 |
| 10,618,433 | B2 * | 4/2020 | Goto ..................... | B60N 2/0155 |
| 10,640,015 | B2 * | 5/2020 | Taniguchi ............ | B60N 2/0705 |
| 2018/0141467 | A1 * | 5/2018 | Goto ..................... | B60N 2/0155 |

FOREIGN PATENT DOCUMENTS

JP            2017024578 A      2/2017

* cited by examiner

*Primary Examiner* — Steven M Marsh
(74) *Attorney, Agent, or Firm* — Buchanan Ingersoll & Rooney PC

(57) ABSTRACT

A vehicle seat slide apparatus includes: a lower rail; an upper rail movably mounted on the lower rail and configured to support a seat; an annular-shaped lock spring attached to the upper rail; and an unlocking member attached to the upper rail, wherein: the lock spring has a lock portion configured to engage the lower rail to restrict upper rail movement; the unlocking member is configured to release movement restriction of the upper rail by displacing the lock spring to release an engagement state between the lock spring and the lower rail, is disposed inside the lock spring in both longitudinal and width directions of the upper rail, and includes a rotating portion and a pressing portion; the rotating portion is made of one flat plate material, and is configured to rotate; and the pressing portion is configured to be connected to the rotating portion and press the lock spring.

4 Claims, 11 Drawing Sheets

ONE END ←——→ THE OTHER END

VEHICLE SEAT SLIDE APPARATUS

CROSS-REFERENCE TO RELATED APPLICATION

This application claims priority from Japanese Patent Application No. 2019-118991 filed with the Japan Patent Office on Jun. 26, 2019, the entire content of which is hereby incorporated by reference

BACKGROUND

1. Technical Field

The present disclosure relates to a vehicle seat slide apparatus.

2. Related Art

JP-A-2017-024578 discloses a vehicle seat slide apparatus 100 including a lower rail 102 and an upper rail 103 as illustrated in FIG. 13. The upper rail 103 is movably mounted on the lower 102. At the same time, the upper rail 103 supports a seat. The vehicle seat slide apparatus 100 further includes a lock spring 104. The lock spring 104 is attached to the upper rail 103 and engages with the lower rail 102, This restricts the upper rail 103 from moving. A lock lever 105 as an unlocking member is disposed in the upper rail 103 in a longitudinal direction of the upper rail 103. A loop handle 106 projecting from an end of the upper rail 103 in the longitudinal direction is attached to one end of the lock lever 105. When an occupant pulls up the loop handle 106, the one end of the lock lever 105 rises. At the same time, the other end of the lock lever 105 descends with a central upper portion of the lock lever 105 as a fulcrum. The other end of the lock lever 105 pushes down the lock spring 104. This releases an engagement state between the lock spring 104 and the lower rail 102. Thus, movement restriction of the upper rail 103 is released.

SUMMARY

A vehicle seat slide apparatus according to an embodiment of the present disclosure includes: a lower rail; an upper rail movably mounted on the lower rail and configured to support a seat; a lock spring attached to the upper rail and formed in an annular shape; and an unlocking member attached to the upper rail, wherein: the lock spring has a lock portion configured to engage with the lower rail to restrict the upper rail from moving; the unlocking member is configured to release movement restriction of the upper rail by displacing the lock spring to release an engagement state between the lock spring and the lower rail, is disposed inside the lock spring in both a longitudinal direction and a width direction of the upper rail, and includes a rotating portion and a pressing portion; the rotating portion is made of one flat plate material, and is configured to rotate; and the pressing portion is configured to be connected to the rotating portion and press the lock spring.

DETAILED DESCRIPTION

Figure 1:
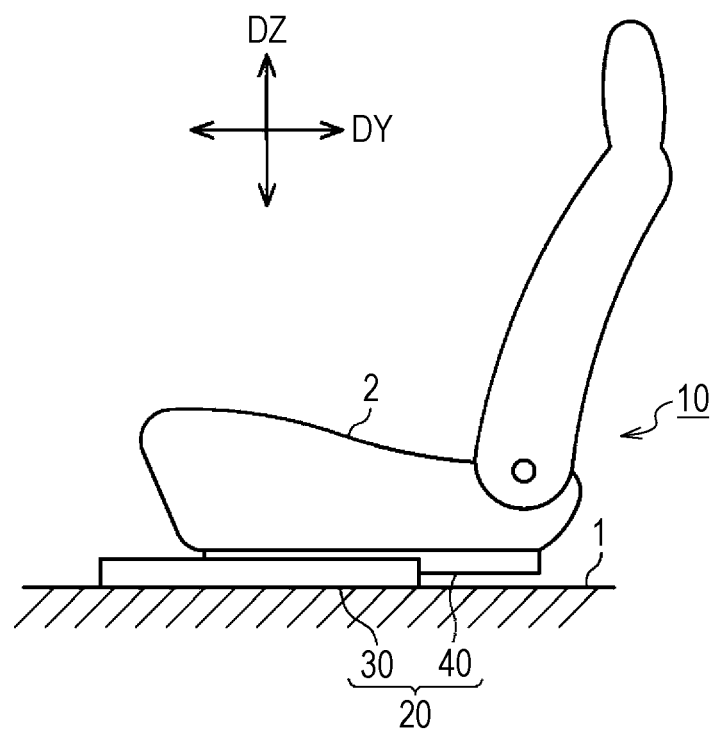
FIG. 1 is a side view of a vehicle seat slide apparatus having a mounted seat.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

JP-A-2017-0241578 mentions miniaturization of a vehicle seat slide apparatus as a problem. The vehicle seat slide apparatus according to an embodiment of the present disclosure has been made in view of such circumstances. An object of the disclosure is to provide the vehicle seat slide apparatus that can be downsized.

In order to achieve the object, a vehicle seat slide apparatus includes: a lower rail; an upper rail movably mounted on the lower rail and configured to support a seat; a lock spring attached to the upper rail and formed in an annular shape; and an unlocking member attached to the upper rail. The lock spring has a lock portion configured to engage with the lower rail to restrict the upper rail from moving, the unlocking member is configured to release movement restriction of the upper rail by displacing the lock spring to release an engagement state between the lock spring and the lower rail, is disposed inside the lock spring in both a longitudinal direction and a width direction of the upper rail, and includes a rotating portion and a pressing portion, the rotating portion is made of one flat plate material, and is configured to rotate, and the pressing portion is configured to be connected to the rotating portion and press the lock spring.

With this configuration, the unlocking member is located inside the lock spring in both the longitudinal direction and the width direction of the upper rail. Thus, a space inside the lock spring can be efficiently used. Therefore, the vehicle seat slide apparatus can be downsized. Further, the rotating portion of the unlocking member is made of one flat plate material. Thus, a thickness of the rotating portion can be made thinner than that in a form including the rotating portion made of a plurality of stacked plate materials or a bent plate material. Since the thickness of the rotating portion is relatively thin, a space inside the upper rail can be efficiently used. Therefore, the vehicle seat slide apparatus can be downsized.

The rotating portion and the pressing portion of the vehicle seat slide apparatus are preferably made of an integrally molded product. In this structure, the rotating portion and the pressing portion are made of the integrally molded product. Thus, there is no need to use another member to connect the rotating portion and the pressing portion. Further, a step of integrating the rotating portion and the pressing portion by welding or the like is unnecessary. Since no other member is used, the vehicle seat slide apparatus can also be downsized.

The pressing portion of the vehicle seat slide apparatus is preferably made of one bent plate material. In this structure, the pressing portion is made of one bent plate material. Thus, the pressing portion can be efficiently formed.

The pressing portion of the vehicle seat slide apparatus preferably projects from both sides of the flat plate material in a thickness direction of the flat plate material forming the rotating portion. In this structure, the pressing portion projects from both sides of the flat plate material in the thickness direction of the flat plate material forming the rotating portion. Thus, a load applied to the pressing portion when the lock spring is pressed can be more evenly transmitted to the rotating portion. Further, there is no need to manufacture the pressing portion by welding the plurality of stacked plate materials. This can suppress distortion of the plate material due to welding heat.

With the vehicle seat slide apparatus of the present disclosure, the vehicle seat slide apparatus can be downsized.

One embodiment of the vehicle seat slide apparatus will be described. As illustrated in FIG. 1, a seat 2 is mounted on a vehicle seat slide apparatus 10. The vehicle seat slide apparatus 10 is attached to a vehicle floor 1. In the vehicle seat slide apparatus 10, the seat 2 can be moved in a front-rear direction of a vehicle. At the same time, the seat 2 can be fixed at a predetermined position.

Figure 2:
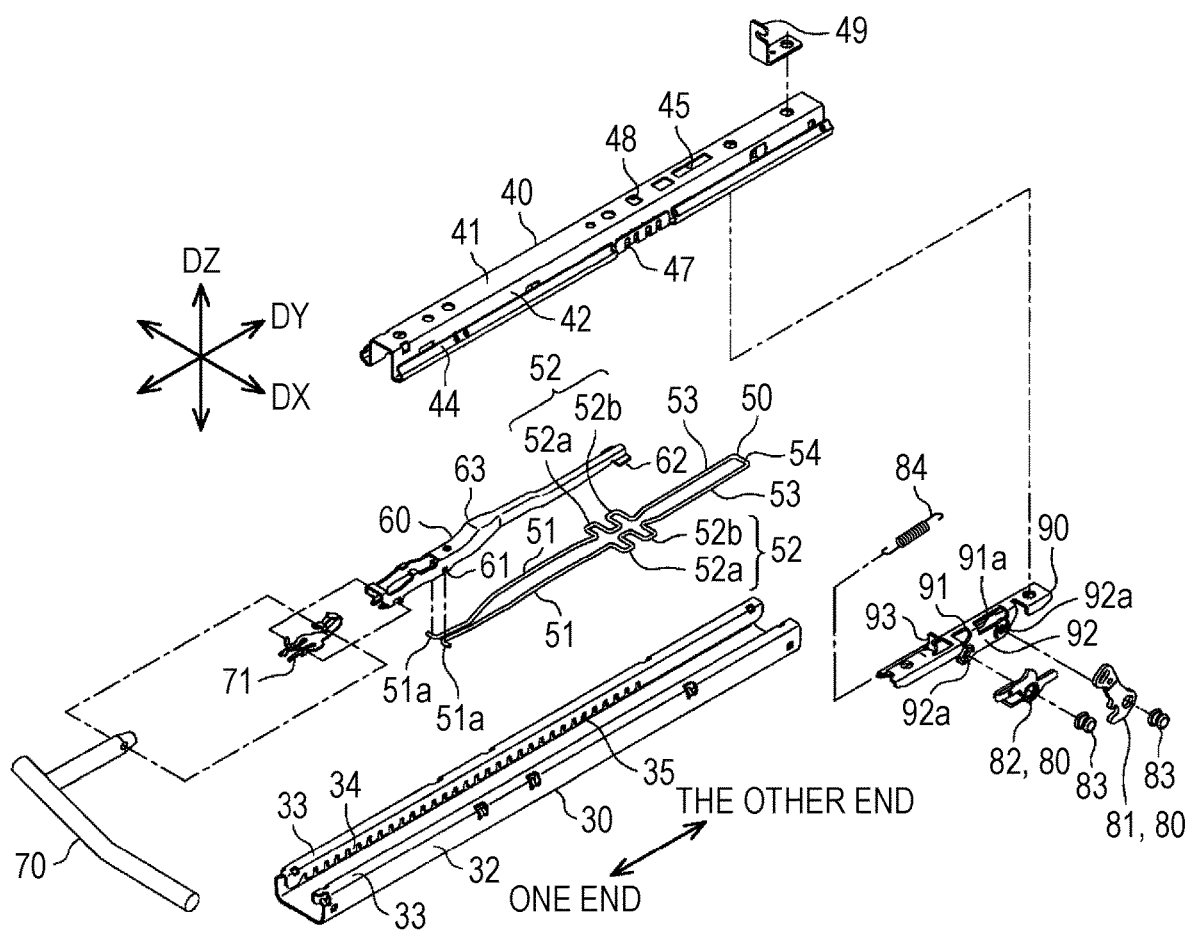
FIG. 2 is an exploded perspective view of the vehicle seat slide apparatus according to an embodiment of the present disclosure.
Figure 3:
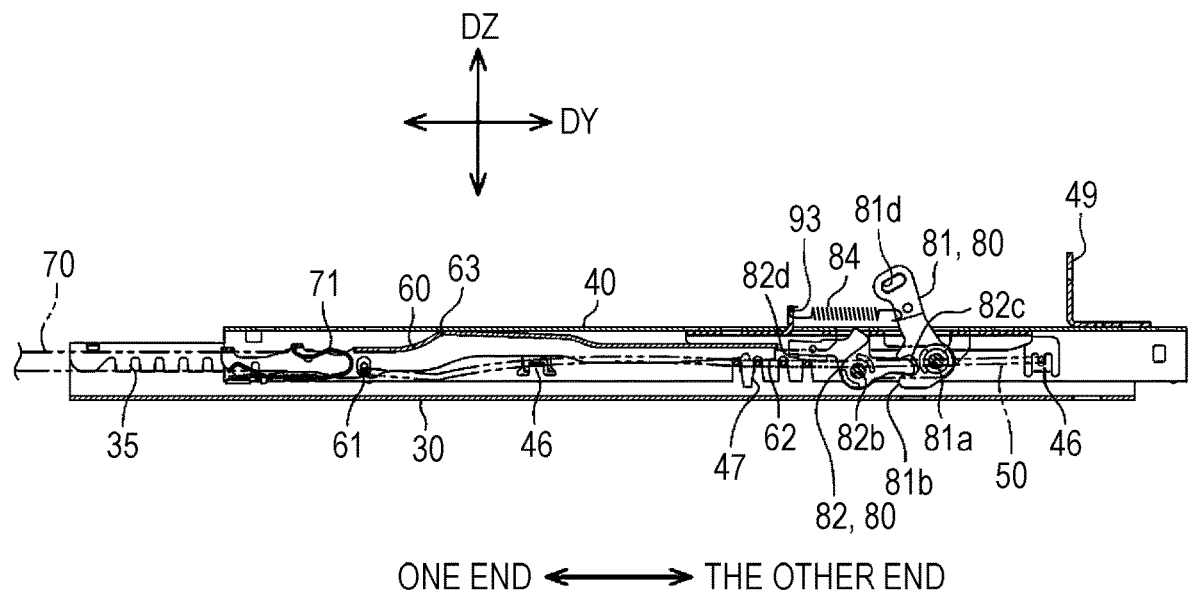
FIG. 3 is a side view of the vehicle seat slide apparatus according to the embodiment of the present disclosure.

As illustrated in FIGS. 1 to 3, the vehicle seat slide apparatus 10 includes a slide rail 20. The slide rail 20 includes a lower rail 30 attached to the vehicle floor 1 and an upper rail 40 supporting the seat 2. The upper rail 40 is movably mounted on the lower rail 30. Here, a pair of lower rails 30 and a pair of upper rails 40 are provided. When the slide rail 20 is provided on the vehicle floor 1, the front-rear direction of the vehicle is referred to as a "front-rear direction DY". The width direction of the vehicle is referred to as a "width direction DX". A vertical direction of the vehicle is referred to as a "vertical direction DZ". The front-rear direction DY of the vehicle seat slide apparatus 10 matches the "longitudinal direction" of the lower rail 30 and the upper rail 40 of the vehicle seat slide apparatus 10, The vertical direction DZ is a direction perpendicular to both the front-rear direction DY and the width direction DX.

Figure 4:
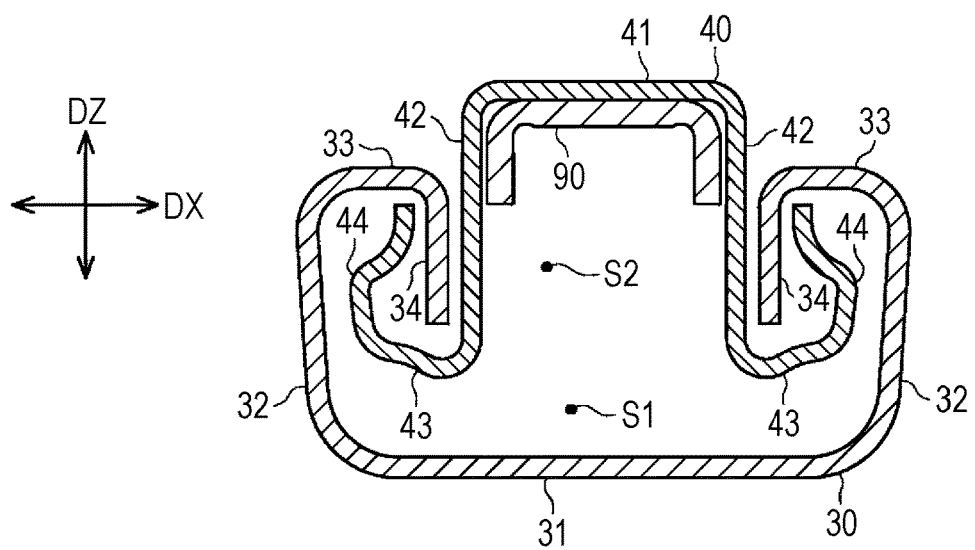
FIG. 4 is a schematic view of the vehicle seat slide apparatus according to the embodiment of the present disclosure as viewed from a front-rear direction.

A structure of the slide rail 20 will be described. As illustrated in FIG. 4, the lower rail 30 includes a plate-shaped bottom wall portion 31 fixed to the vehicle floor 1. At both ends of the bottom wall portion 31 in the width direction DX, a pair of side wall portions 32 extending upward in the vertical direction DZ are provided. Horizontal wall portions 33 are respectively provided at ends of the pair of side wall portions 32 on the opposite side of the bottom wall portion 31. The horizontal wall portion 33 extends inwardly of the bottom wall portion 31 in the width direction DX. Vertical wall portions 34 extending downward in the vertical direction DZ are respectively provided at ends of the pair of horizontal wall portions 33 on the opposite side of the side wall portion 32. The pair of vertical wall portions 34 is provided at an interval. That is, a gap is formed between the vertical wall portions 34. The lower rail 30 has an internal space S1 defined by the bottom wall portion 31, the pair of side wall portions 32, the pair of horizontal wall portions 33, and the pair of vertical wall portions 34. The internal space S1 communicates with an external space through the gap between the vertical wall portions 34 in the vertical direction DZ.

As illustrated in FIGS. 2 and 3, the vertical wall portion 34 of the lower rail 30 is provided with first cutouts 35 extending upward in the vertical direction DZ from its lower end. Here, the first cutouts 35 are arranged at equal intervals in the front-rear direction DY of the lower rail 30. A lock spring 50 engages with both the first cutout 35 and a second cutout 47 of the upper rail 40 described below. This restricts the upper rail 40 from moving.

As illustrated in FIG. 4, the upper rail 40 includes a plate-shaped top wall portion 41 that extends parallel to the vehicle floor 1. A pair of side wall portions 42 extending downward in the vertical direction DZ are provided at both ends of the top wall portion 41 in the width direction DX. Horizontal wall portions 43 extending outwardly of the top wall portion 41 in the width direction DX are respectively provided at ends of the pair of side wall portions 42 that are opposite to the top wall portion 41. Vertical wall portions 44 extending upward in the up-down direction DZ are respectively provided at ends of the pair of horizontal wall portions 43 on the opposite side of the side wall portions 42. The upper rail 40 has an internal space S2 defined by the top wall portion 41 and the pair of side wall portions 42.

As illustrated in FIG. 2, the top wall portion 41 of the upper rail 40 is formed with an insertion hole 45 through which an unlocking member 80 described below is inserted and an insertion hole 48 through which a third wall portion 93 of a reinforcing member 90 is inserted. A wire support 49 is attached to the top wall portion 41 of the upper rail 40. The wire support 49 supports a wire that operates the unlocking member 80.

As illustrated in FIGS. 2 and 3, the vertical wall portion 44, the horizontal wall portion 43, and the side wall portion 42 are provided with second cutouts 47 extending upward in the vertical direction DZ from a lower end at a longitudinal center of the upper rail 40. Here, four second cutouts 47 are arranged at equal intervals in the front-rear direction DY of the upper rail 40. That is, a total of eight second cutouts 47 are arranged at positions facing each other in the pair of side wall portions 42. Shapes of the second cutouts 47 and intervals between the second cutouts 47 are substantially the same as those of the first cutouts 35 provided in the lower rail 30. The second cutouts 47 function as engaged portions with which curved portions 52 of the lock spring 50 described below are engaged.

As illustrated in FIG. 4, the upper rail 40 is slidably mounted on the lower rail 30. Here, the pair of horizontal wall portions 43 is inserted into the internal space S1 of the lower rail 30 through the gap formed between the pair of vertical wall portions 34 of the lower rail 30. When the upper rail 40 is mounted on the lower rail 30, the horizontal wall portions 43 of the upper rail 40 and the horizontal wall portions 33 of the lower rail 30 are arranged at positions overlapping each other in the vertical direction DZ. This prevents the upper rail 40 from being removed from the lower rail 30 in the vertical direction DZ. The lock spring 50 engages with both the first cutout 35 of the lower rail 30 and the second cutout 47 of the upper rail 40 which are arranged in overlapping positions. This restricts the upper rail 40 from moving.

Figure 5A:
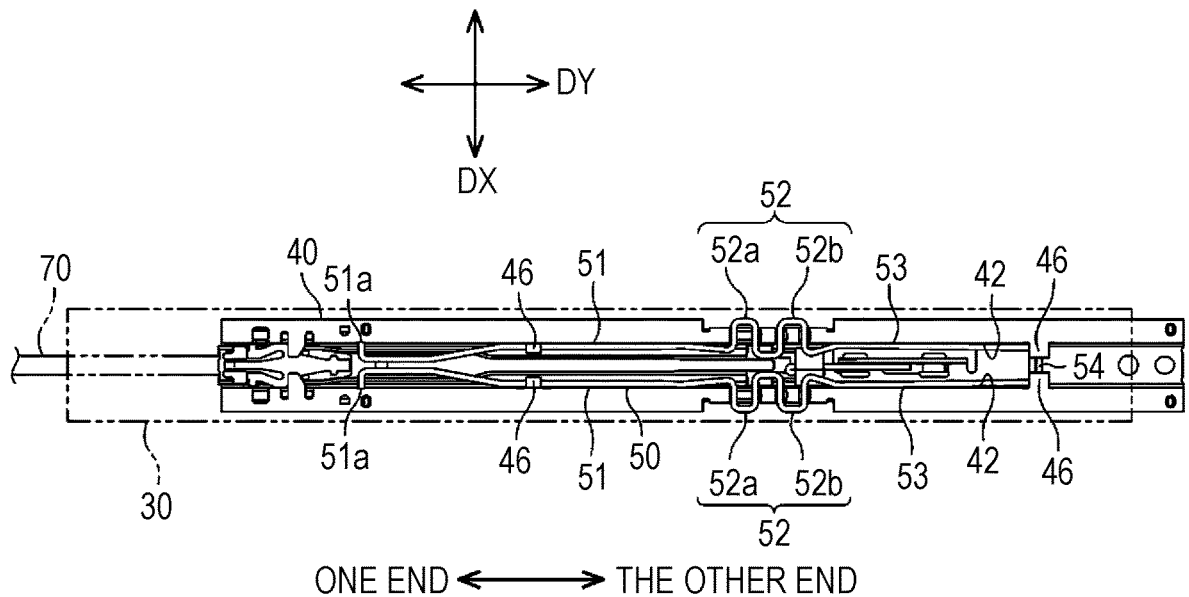
FIG. 5A is a bottom view of the vehicle seat slide apparatus according to the embodiment of the present disclosure.

As illustrated in FIG. 5A, a part of the side wall portion 42 is folded inwardly in the width direction DX at one end and the other end of the upper rail 40 in the front-rear direction DY of each of the pair of side wall portions 42 of the upper rail 40, to form claw portions 46. That is, each of the pair of side wall portions 42 has two claw portions 46. The lock spring 50 is supported on the claw portion 46. Thus, the lock spring 50 is attached to the internal space S2 of the upper rail 40.

A structure of the lock spring 50 will be described. As illustrated in FIGS. 2 and 5A, the lock spring 50 is an elongated annular member obtained by bending a flexible wire material. When the lock spring 50 is attached to the internal space S2 of the upper rail 40, the lock spring 50 has a pair of first extending portions 51 extending along the pair of side wall portions 42 of the upper rail 40 and a pair of curved portions 52 that are curved outward in the width direction DX on the other end side of the first extending portions 51. The lock spring 50 further has, on the other end side of the curved portions 52, a pair of second extending portions 53 extending along the pair of side wall portions 42 of the upper rail 40 and a connecting portion 54 connecting the other ends of the second extending portions 53. The curved portions 52 are located substantially at a longitudinal center of the lock spring 50. The curved portion 52 of the lock spring 50 has a shape projecting outward in the width direction DX at two different positions in the front-rear direction DY. That is, the curved portion 52 includes a first curved portion 52a on one end side and a second curved portion 52b on the other end side.

The pair of first extending portions 51 of the lock spring 50 is configured to approach each other as they go toward the one end. Ends on the one end side of the pair of first extending portions 51 respectively have bent portions 51a that are bent outward in the width direction DX. The bent portions 51a are configured to engage with a recess 61 of a lock lever 60 described below. A gap is formed between the bent portions 51a. The lock spring 50 is formed in an annular shape that is open between the bent portions 51a.

Figure 5B:
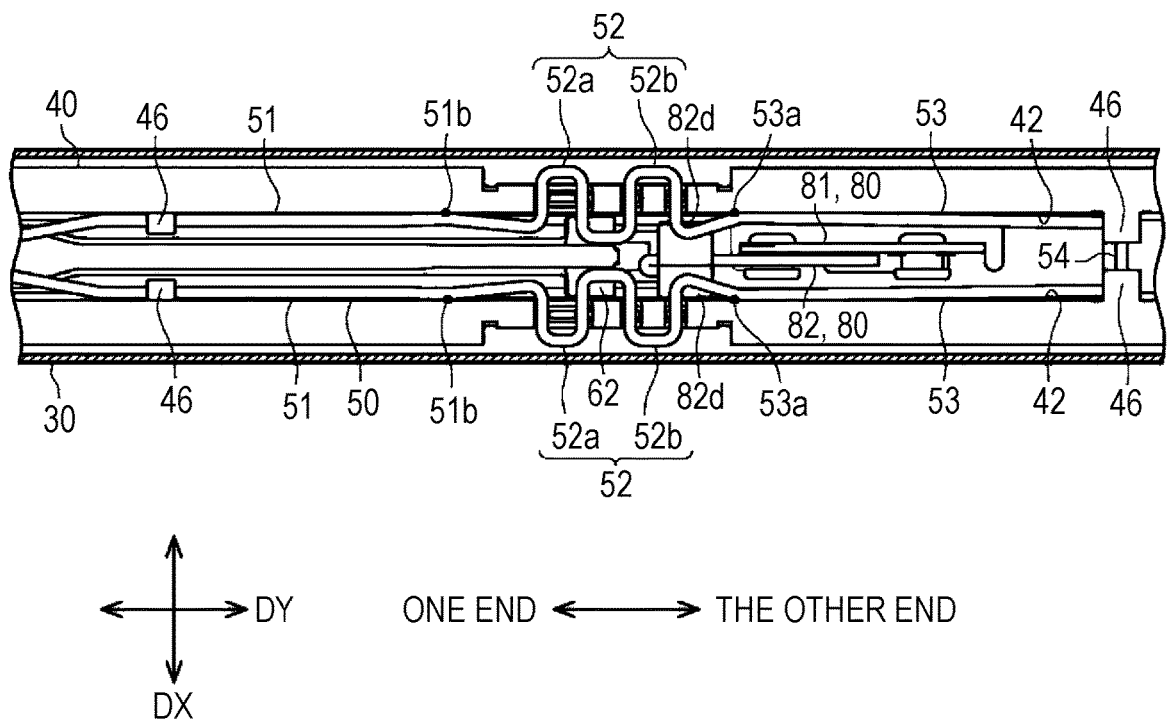
FIG. 5B is a partially enlarged view of FIG. 5A.

As illustrated in FIG. 5B, the pair of first extending portions 51 is configured to be separated from each other as they go toward the other end. First separated portions Sib are formed at positions where the pair of first extending portions 51 is most distant from each other near connection portions between the first extending portions 51 and the curved portions 52. That is, the pair of first extending portions 51 is configured to be most distant from each other in the width direction DX at the first separated portions 51b.

The pair of second extending portions 53 is configured to be separated from each other as they go toward the one end. Near connection portions between the second extending portions 53 and the curved portions 52, second separated portions 53a are formed at positions where the pair of second extending portions 53 is most distant from each other. That is, the pair of second extending portions 53 is configured to be most distant from each other in the width direction DX at the second separated portions 53a.

As illustrated in FIGS. 5A and 5B, the first extending portions 51 of the lock spring 50 and the connecting portion 54 are supported by the claw portions 46 provided on the pair of side wall portions 42 of the upper rail 40. In this state, the lock spring 50 is attached to the internal space S2 of the upper rail 40. The lock spring 50 is supported by the claw portions 46 on the one end side and the other end side in the longitudinal direction. The curved portion 52 is located substantially in the middle of portions of the lock spring 50 supported by the claw portions 46. In this state, the first separated portions 51b and the second separated portions 53a of the lock spring 50 press the side wall portions 42 of the upper rail 40 and are in point contact with the pair of side wall portions 42. That is, the first separated portions 51b and the second separated portions 53a of the lock spring 50 respectively function as a first contact portion and a second contact portion. Points where the lock spring 50 and the pair of side wall portions 42 of the upper rail 40 are in point contact with each other are closer to the curved portions 52 of the lock spring 50 than the one end and the other end of the lock spring 50. The first curved portion 52a and the second curved portion 52b of the curved portion 52 of the lock spring 50 engage with both the second cutout 47 of the upper rail 40 and the first cutout 35 of the lower rail 30. This restricts the upper rail 40 from moving. Therefore, the curved portions 52 of the lock spring 50 function as the lock portion. Further, the lock spring 50 bends with points supported by the claw portions 46 as fulcrums. Thus, the curved portion 52 located at the longitudinal center of the lock spring 50 can be displaced (pushed down) downward in the vertical direction DZ.

A structure of the lock lever 60 will be described. As illustrated in FIG. 2, the lock lever 60 is formed in a long shape. The lock lever 60 is attached between the top wall portion 41 of the upper rail 40 and the lock spring 50 in the internal space S2 of the upper rail 40. An attachment member 71 for connecting a loop handle 70 described below is attached to one end of the lock lever 60. That is, the loop handle 70 is attached to the lock lever 60 through the attachment member 71. On the other end of the lock lever 60, a pushing portion 62 that displaces the curved portion 52 of the lock spring 50 is formed. A protrusion 63 is formed on a longitudinal central upper portion of the lock lever 60. The protrusion 63 contacts an inside of the top wall portion 41 of the upper rail 40. Thus, the protrusion 63 is a rotation fulcrum of the lock lever 60. The recess 61 is formed in a lower portion on one end side of the lock lever 60. The recess 61 engages the bent portions 51a of the lock spring 50.

An unlocking mechanism by the lock lever 60 will be described. The loop handle 70 attached to the lock lever 60 is pulled up. Then, the one end of the lock lever 60 rises through the attachment member 71. Along with this, the other end of the lock lever 60 descends with the central upper portion of the lock lever 60 as the fulcrum. The pushing portion 62 of the lock lever 60 displaces the curved portions 52 of the lock spring 50. Then, the curved portions 52 of the bent lock spring 50 are displaced. In this manner, engagement between the curved portions 52 of the lock spring 50 and the second cutout 47 of the upper rail 40 and the first cutout 35 of the lower rail 30 is released. This releases movement restriction of the upper rail 40. By operation on the front side of the vehicle, the movement restriction of the upper rail 40 can be released. Therefore, the lock lever 60 functions as a front unlocking member.

Figure 6A:
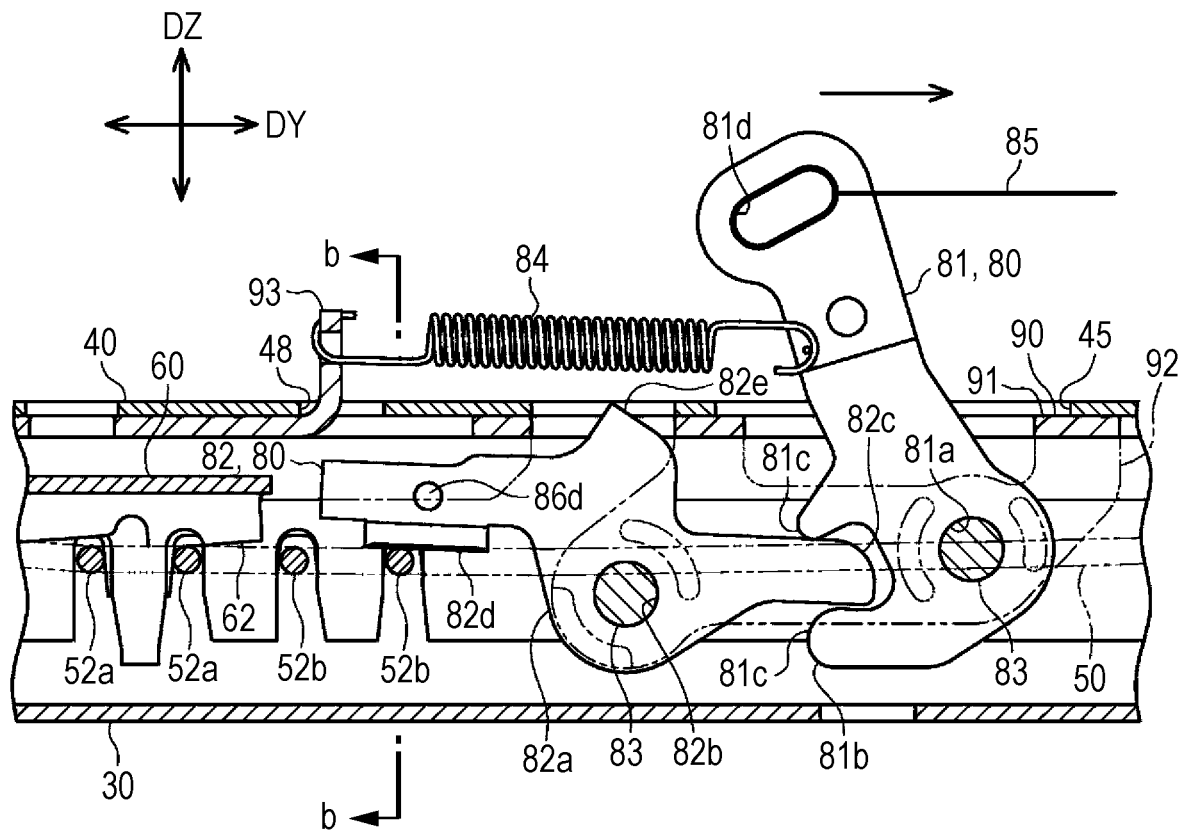
FIG. 6A is a side view of an unlocking member.

A structure of the unlocking member 80 will be described. As illustrated in FIG. 6A, the unlocking member 80 includes a long plate-shaped first member 81 and a long plate-shaped second member 82. The second member 82 is formed by one bent plate material 86 (see FIGS. 10A to 10C). A shaft hole 81a into which a shaft member 83 is inserted and a first engaging portion 81b engaging with the second member 82 are formed at one end of the first member 81 in the longitudinal direction. The first engaging portion 81b of the first member 81 includes protrusions 81c protruding in a short direction at two different longitudinal positions of the first member 81. The protrusion 81c has a tip formed in a semicircular shape. A second engaging portion 82c of the second member 82 is engaged between the two protrusions 81c. The other end of the first member 81 in the longitudinal direction is provided with a through-hole 81d to which a wire 85 for operating the first member 81 is attached.

As illustrated in FIG. 6A, the second member 82 is made of one flat plate material. The second member 82 includes a rotating portion 82a that rotates, a pressing portion 82d, a stopper 82e, and the second engaging portion 82c. The pressing portion 82d is connected to the rotating portion 82a and presses the lock spring 50. The stopper 82e is connected to the rotating portion 82a and restricts the rotating portion 82a from rotating. The second engaging portion 82c is connected to the rotating portion 82a and engages with the first member 81. Here, "flat" means flat plate-shaped. The "flat" also includes a shape that is slightly curved in the thickness direction of the plate material.

The rotating portion 82a has a long shape. A shaft hole 82b into which the shaft member 83 is inserted is formed at a longitudinal center of the rotating portion 82a. Further, the elongated second engaging portion 82c is provided at one end of the rotating portion 82a in the longitudinal direction. The pressing portion 82d is provided at the other end of the rotating portion 82a in the longitudinal direction. The stopper 82e is provided at the longitudinal center of the rotating portion 82a. The stopper 82e projects in a short, direction (upward in the vertical direction DZ in FIG. 6A) from an end of the rotating portion 82a in the short direction.

Figure 6B:
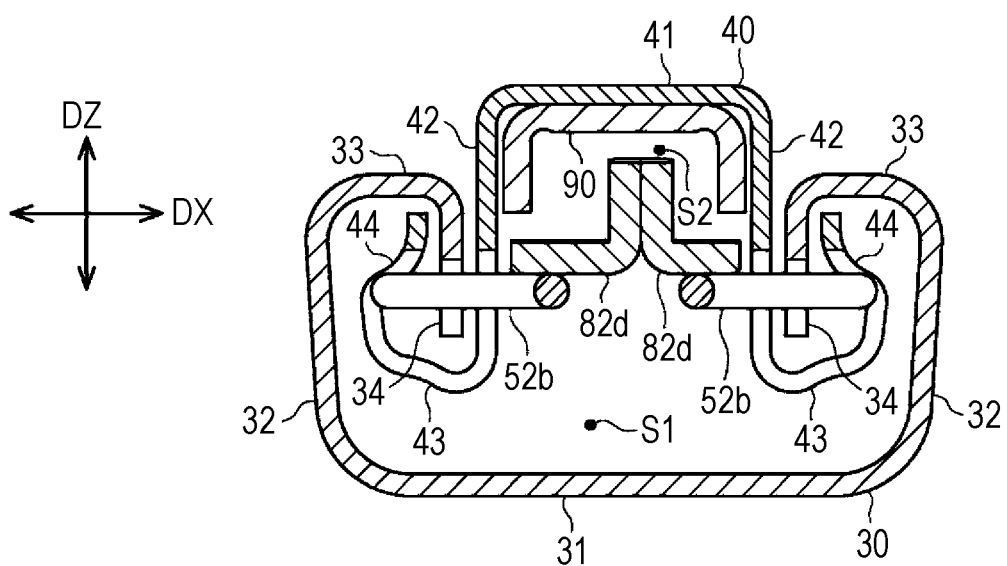
FIG. 6B is a cross-sectional view taken along a line b-b of FIG. 6A.

As illustrated in FIG. 6B, pressing portions 82d of the second member 82 project from both sides of the flat plate material in the thickness direction (width direction DX) of the flat plate material forming the rotating portion 82a. In other words, a dimension of the pressing portions 82d in the width direction DX is larger than that of the rotating portion 82a in the same direction. Then, when the second member 82 is viewed from the front-rear direction DY, the rotating portion 82a is located at a substantially center of the pressing portions 82d in the width direction DX.

As illustrated in FIG. 64, the stopper 82e projects in the short direction (upward in the vertical direction DZ of FIG. 6A) from the end of the rotating portion 82a in the short direction at the longitudinal center of the rotating portion 82a. As described below, when the rotating portion 82a is rotated, the stopper 82e contacts a first wall portion 91 of the reinforcing member 90. Thus, the rotating portion 82a is restricted from moving at a predetermined position.

The rotating portion 82a, the pressing portions 82d, the stopper 82e, and the second engaging portion 82c are made of the integrally molded product. Specifically, the rotating portion 82a, the pressing portions 82d, the stopper 82e, and the second engaging portion 82c are formed by the one bent plate material 86.

Figure 10A:
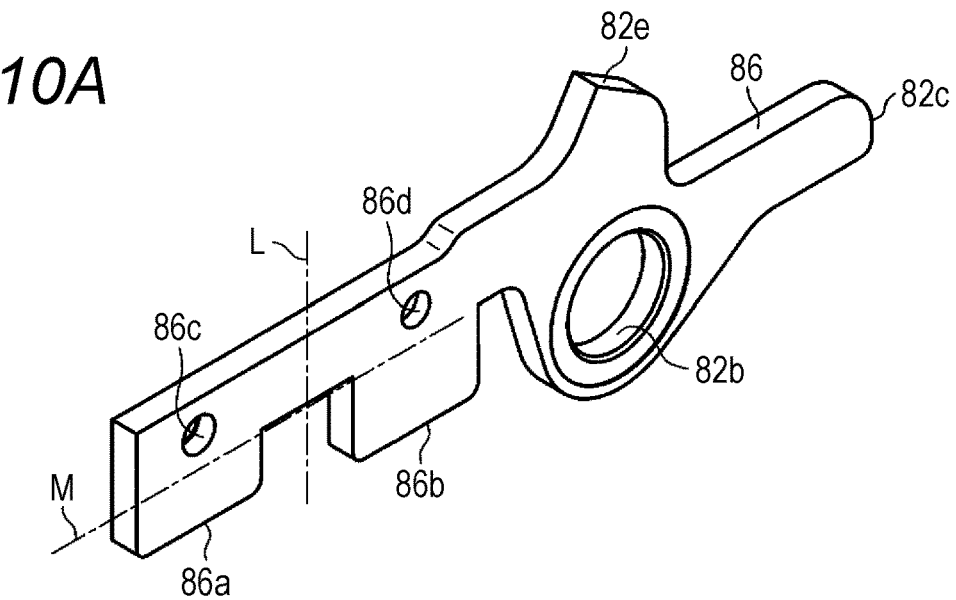
FIGS. 10A to 10C are views illustrating a method for manufacturing a second member of the unlocking member.

A method for manufacturing the second member 82 will be described. As illustrated in FIG. 10A, one long plate material 86 is used for manufacturing the second member 82. The long plate material 86 can be manufactured, for example, by punching a plate material having a predetermined size. The long plate material 86 has the shaft hole 82b at its longitudinal center. The plate material 86 further has a stopper 82e projecting in the short direction of the plate material 86 at the longitudinal center. The plate member 86 has the second engaging portion 82c at one end thereof in the longitudinal direction. The plate member 86 has two rectangular projecting pieces that project in the same direction in the short direction of the plate member 86 at the other end thereof in the longitudinal direction. The two projecting pieces are juxtaposed in the longitudinal direction of the plate material 86 with a predetermined interval. The two projecting pieces are a first projecting piece 86a located on the other end side of the plate material 86, and a second projecting piece 86b located closer to the one end of the plate material 86 (on a side closer to the rotating portion 82a) than the first projecting piece 86a. A projecting length of the second projecting piece 86b is greater than that of the first projecting piece 86a.

A first bent portion indicated by an imaginary line M is provided at base ends of the first projecting piece 86a and the second projecting piece 86b. A second bent portion indicated by an imaginary line L is provided between the first projecting piece 86a and the second projecting piece 86b.

A through-hole 86c is disposed at a predetermined distance from the first projecting piece 86a in the short direction of the plate material 86. Similarly, a projecting portion is provided at a predetermined distance from the second projecting piece 86b in the short direction of the plate material 86. The projecting portion projects in the thickness direction of the plate material 86 on a back side of a paper of FIG. 10A. A recess 86d due to the projecting portion is formed on a front side of the paper of FIG. 10A.

Figure 10B:
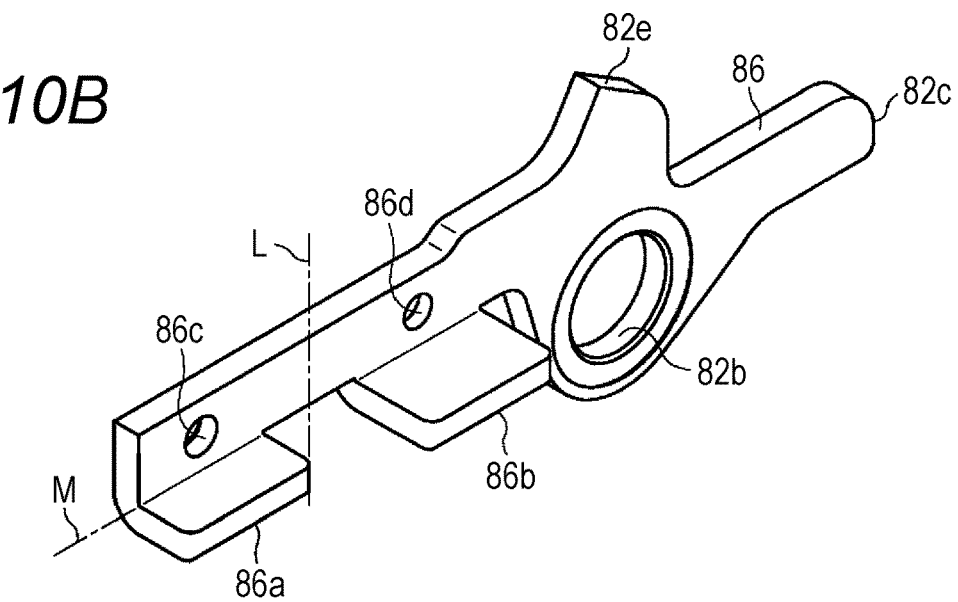

As illustrated in FIG. 10B, the first projecting piece 86a and the second projecting piece 86b are bent forwardly of the paper in the same direction, starting from the first bent portion. Surfaces of the first projecting piece 86a and the second projecting piece 86b are bent to be substantially perpendicular to the surface of the plate material 86.

Figure 10C:
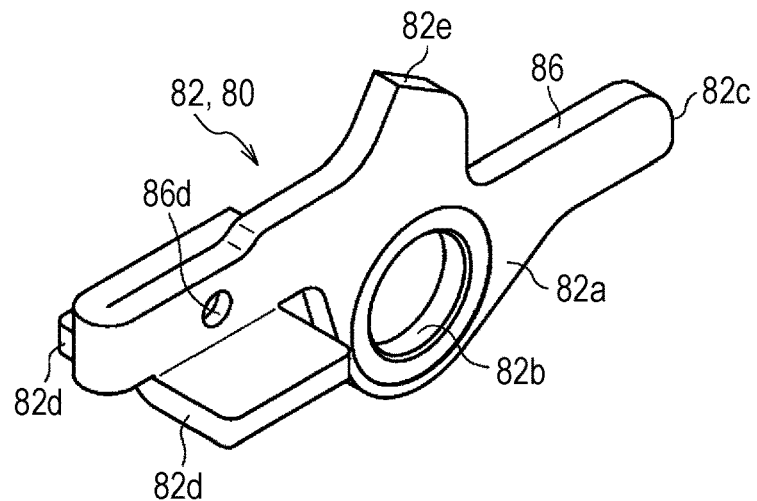

As illustrated in FIG. 10C, the first projecting piece 86a of the plate material 86 is bent backward of the paper, starting from the second bent portion. The plate member 86 is caulked by the projecting portion inserted into the through-hole 86c. In this way, the second bent portion is located at a tip portion which is the other end of the second member 82 in the longitudinal direction. Further, the pressing portions 82d are formed by the bent first projecting piece 86a and the second projecting piece 86b. By the above method, the second member 82 of the unlocking member 80 is manufactured as the integrally molded product.

As illustrated in FIG. 2, the unlocking member 80 is attached to the reinforcing member 90 attached to the internal space S2 of the upper rail 40. A structure of the reinforcing member 90 will be described.

As illustrated in FIGS. 2 and 4, the reinforcing member 90 is formed in a long shape. The reinforcing member 90 is used by being attached inside the top wall portion 41 and the side wall portions 42 of the upper rail 40. The reinforcing member 90 is attached by welding or caulking inside the top wall portion 41 and the side wall portions 42 of the upper rail 40 where the second cutouts 47 are formed. Thus, strength around a portion where the second cutouts 47 of the upper rail 40 are formed is reinforced. That is, the reinforcing member 90 is provided around the second cutouts 47, which is a position overlapping at least the second cutouts 47 in the width direction of the upper rail 40.

As illustrated in FIGS. 8A to 8D, the reinforcing member 90 has the first wall portion 91 and a second wall portion 92. The first wall portion 91 is curved to follow shapes of the top wall portion 41 and the side wall portions 42 of the upper rail 40. In the second wall portion 92, a part of the first wall portion 91 is cut and raised downward in the vertical direction DZ. The second wall portion 92 extends downward of the upper rail 40 from a center of the first wall portion 91 in the width direction DX. A part of the first wall portion 91 is cut and raised so that its wall surface extends in the front-rear direction DY and the vertical direction DZ. Further, the reinforcing member 90 has a third wall portion 93. In the third wall portion 93, a part of the first wall portion 91 is cut and raised upward in the vertical direction DZ. In the third wall portion 93, a part of the first wall portion 91 is cut and raised so that its wall surface extends in the width direction DX and the vertical direction DZ. The first wall portion 91 is formed with an insertion hole 91a into which the first member 81 of the unlocking member 80 described below is inserted. The second wall portion 92 is provided with through-holes 92a at two different locations in the longitudinal direction. The unlocking member 80 is attached to the through-holes 92a. A spring material 84 urging the unlocking member 80 is attached to the third wall portion 93.

A structure for assembling the unlocking member 80 will be described. As illustrated in FIGS. 9A to 9D, the shaft member 83 is attached to the through-hole 92a of the second wall portion 92 of the reinforcing member 90 and the shall hole 81a of the first member 81 of the unlocking member 80 which overlap each other. Thus, the first member 81 of the unlocking member 80 is rotatably attached to the second wall portion 92. Further, the shaft member 83 is attached to the through-hole 92a of the second wall portion 92 of the reinforcing member 90 and the shaft hole 82b of the second member 82 of the unlocking member 80 which overlap each other. Thus, the second member 82 of the unlocking member 80 is rotatably attached to the second wall portion 92. At the time of this attachment, the first member 81 and the second member 82 of the unlocking member 80 are engaged with each other in the first engaging portion 81b and the second engaging portion 82c.

As illustrated in FIGS. 3 and 4, the reinforcing member 90 to which the unlocking member 80 is attached is attached inside the upper rail 40 by welding or caulking. Thus, the unlocking member 80 is attached to the upper rail 40. In this state, the other end in the longitudinal direction of the first member 81 of the unlocking member 80 projects upward from the insertion hole 45 of the top wall portion 41 of the upper rail 40. Further, the third wall portion 93 of the reinforcing member 90 projects upward from the insertion hole 48 of the top wall portion 41 of the upper rail 40.

As illustrated in FIG. 3, the spring material 84 is attached to the other end in the longitudinal direction of the first member 81 of the unlocking member 80. The spring material 84 is fixed to the third wall portion 93 of the reinforcing member 90. The spring material 84 urges the first member 81 of the unlocking member 80 forward in the front-rear direction DY.

As illustrated in FIG. 6A, the unlocking member 80 is attached to the upper rail 40. In this state, in the second member 82 of the unlocking member 80, one end in the longitudinal direction extends in the front-rear direction DY from the shaft hole 82b. Further, the other end in the longitudinal direction extends obliquely forward and upward in the front-rear direction DY of the upper rail 40 from the shaft hole 82b. Then, the pressing portions 82d provided on the other end of the second member 82 in the longitudinal direction are located on an upper portion of the second curved portion 52b of the lock spring 50.

The unlocking member 80 is attached to the reinforcing member 90. Further, the reinforcing member 90 to which the unlocking member 80 is attached is attached inside the upper rail 40. In this state, the unlocking member 80 is disposed in a region sandwiched between pair of second extending portions 53 of the lock spring 50. Specifically, one flat plate material forming the rotating portion 82a of the second member 82 of the unlocking member 80 is disposed in the region sandwiched between the pair of second extending portions 53 of the lock spring 50 with the surface of the plate material extending in the vertical direction DZ and the front-rear direction DY. Thus, the unlocking member 80 is located inside the lock spring 50 in both the longitudinal direction and the width direction of the upper rail 40. Further, the unlocking member 80 is disposed across the lock spring 50 in the vertical direction of the upper rail 40. That is, when the upper rail 40 is viewed from the width direction DX, the through-hole 81d to which the wire 85 of the first member 81 is attached and the pressing portions 82d of the second member 82 are both arranged above the lock spring 50 in the vertical direction DZ. Further, the shaft hole 81a of the first member 81 and the shaft hole 82b of the second member 82 are both located at a position overlapping the lock spring 50, or at a position below the lock spring 50 in the vertical direction DZ.

The unlocking mechanism by the unlocking member 80 will be described. As illustrated in FIGS. 6A and 6B, the wire 85 attached to the through-hole 81d of the first member 81 of the unlocking member 80 is supported by the wire support and pulled backward in a direction of an arrow. Thus, the first member 81 rotates about the shaft hole 81a in a clockwise direction in the drawing. That is, the first member 81 of the unlocking member 80 is displaced in the longitudinal direction of the upper rail 40 and moves rearward in the front-rear direction DY Along with this, the first engaging portion 81b of the first member 81 moves and pushes up the second engaging portion 82c of the second member 82. Here, displacement of the upper rail 40 in the longitudinal direction also includes the displacement of the upper rail 40 in a direction closer to the front-rear direction DY than to the vertical direction DZ (for example, a direction of ±45° assuming that the front-rear direction DY is 0°).

Figure 7A:
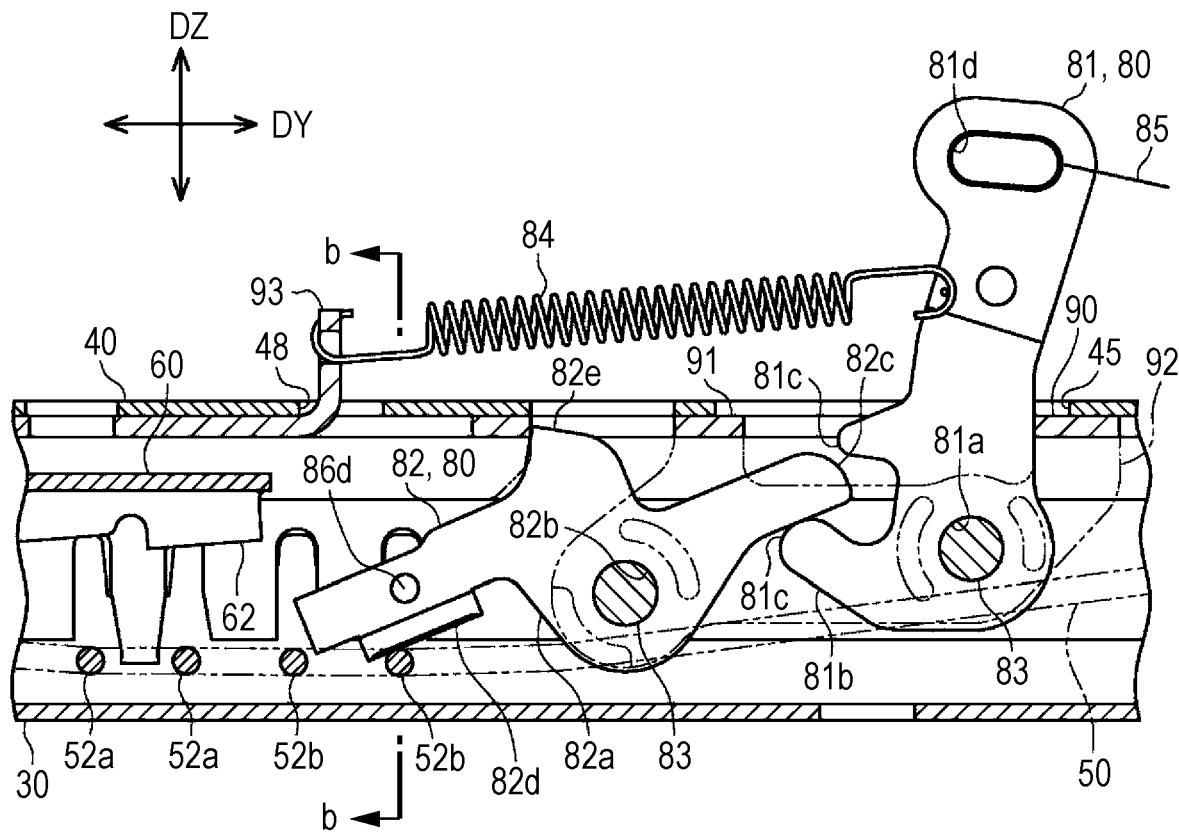
FIG. 7A is a side view of the unlocking member.
Figure 7B:
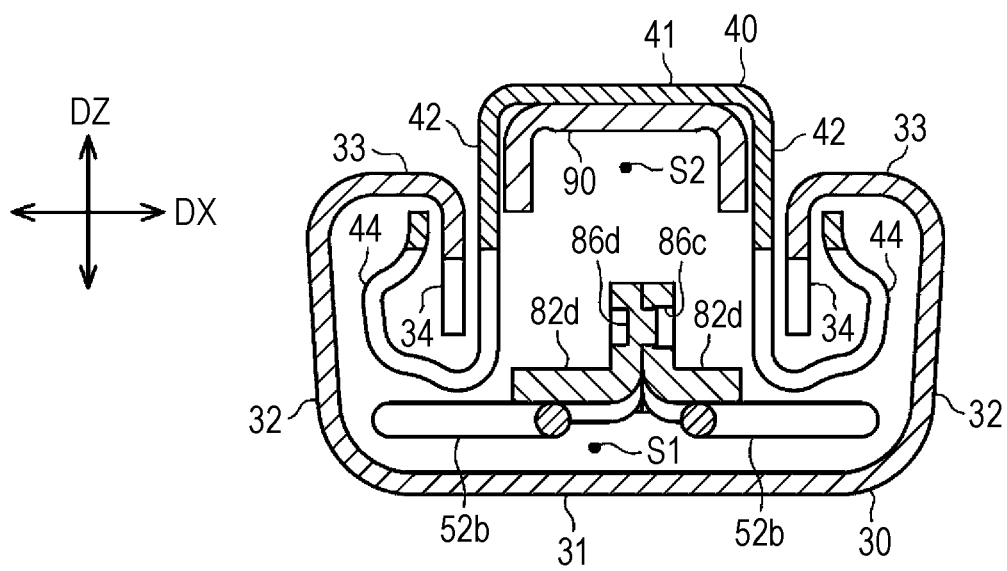
FIG. 7B is a cross-sectional view taken along a line b-b of FIG. 7A.
Figure 8A:
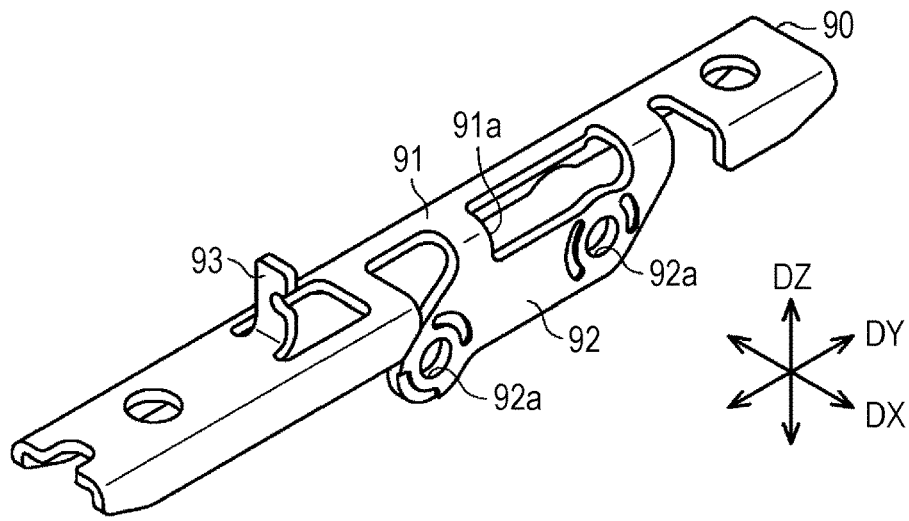
FIG. 8A is a perspective view of a reinforcing member.
Figure 8B:
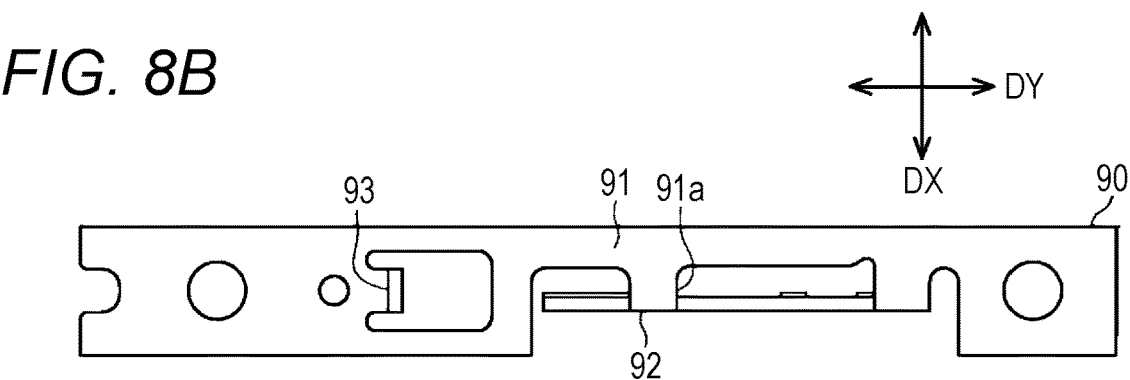
FIG. 8B is a plan view of the reinforcing member.
Figure 8C:
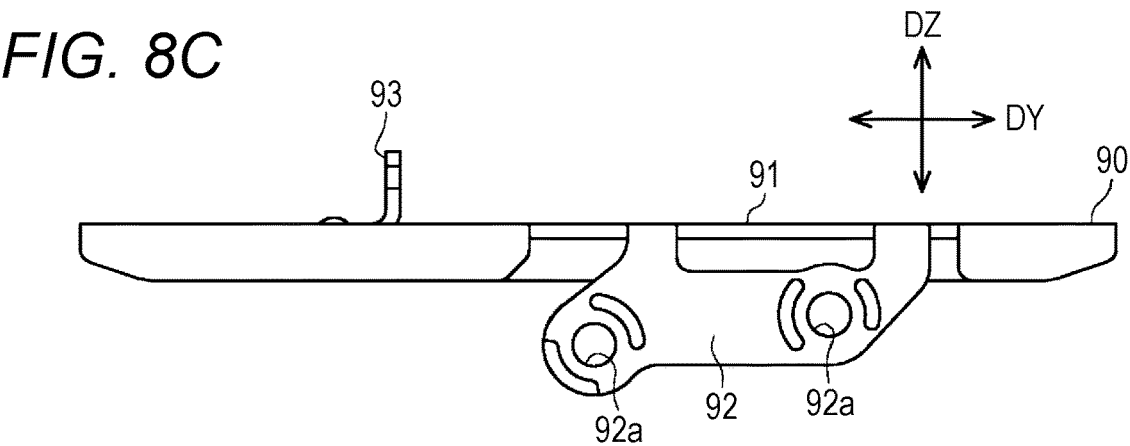
FIG. 8C is a side view of the reinforcing member.
Figure 8D:
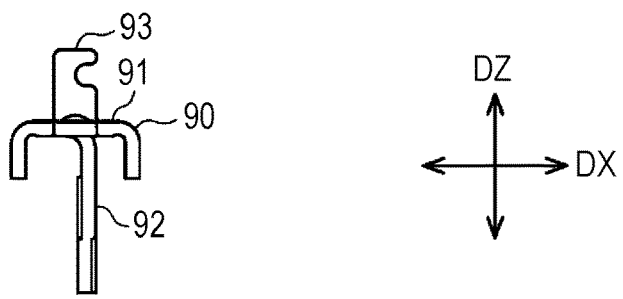
FIG. 8D is a front view of the reinforcing member.
Figure 9A:
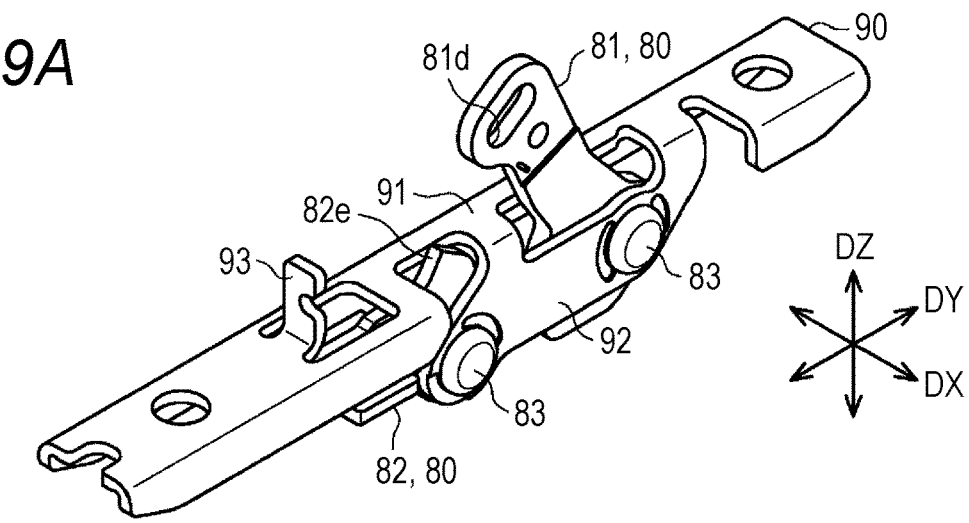
FIG. 9A is a perspective view of the reinforcing member having an attached unlocking member.
Figure 9B:
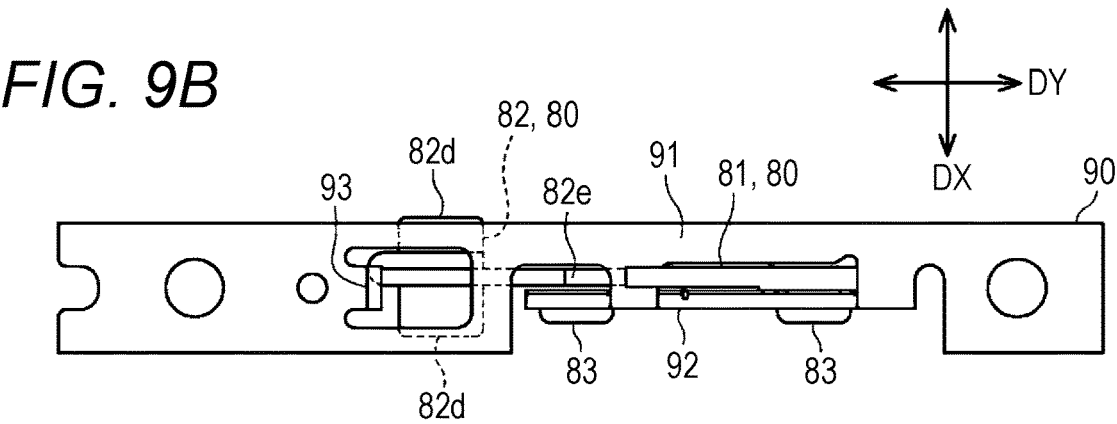
FIG. 9B is a plan view of the reinforcing member.
Figure 9C:
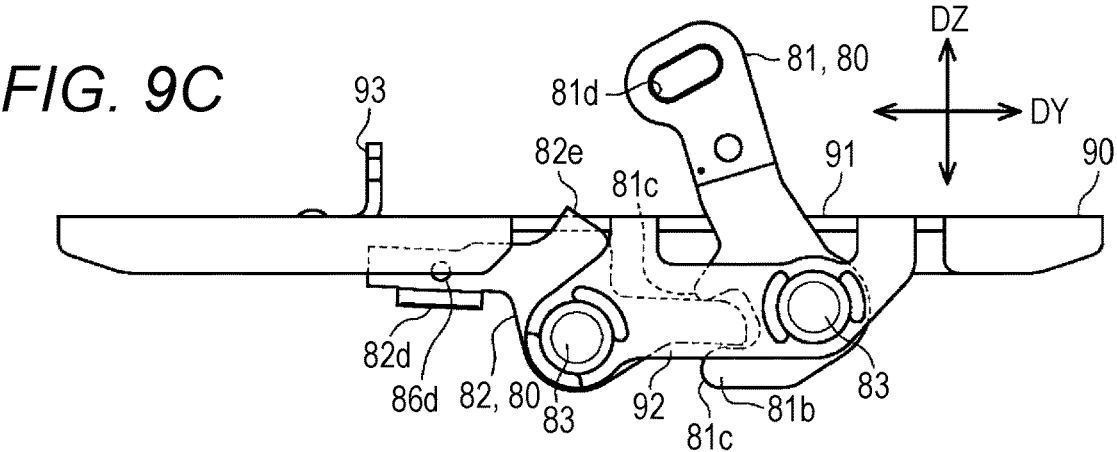
FIG. 9C is a side view of the reinforcing member.
Figure 9D:
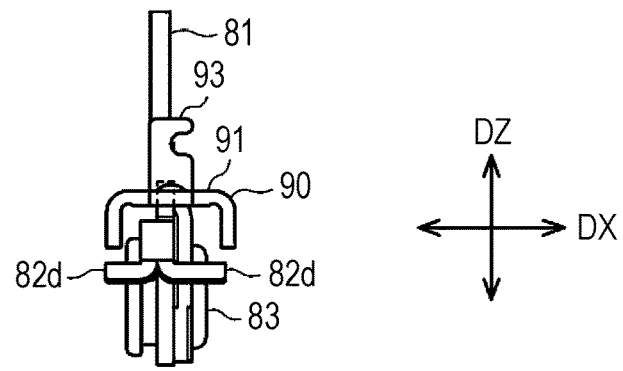
FIG. 9D is a front view of the reinforcing member.

As illustrated in FIGS. 7A and 7B, the second engaging portion 82c of the second member 82 of the unlocking member 80 is pushed up. Thus, the pressing portions 82d at the other end of the second member 82 in the longitudinal direction are displaced downward in the vertical direction DZ. Then, the second curved portion 52b of the lock spring 50 is displaced. At a position where the stopper 82e of the second member 82 contacts the first wall portion 91 of the reinforcing member 90, the rotating portion 82a is restricted from rotating. When the second curved portion 52b of the lock spring 50 is displaced, the lock spring 50 bends. Then, the curved portion 52 of the lock spring 50 is displaced below the second cutout 47 of the upper rail 40 and the first cutout 35 of the lower rail 30 in the vertical direction DZ. In this manner, the curved portion 52 of the lock spring 50 is disengaged from the second cutout 47 of the upper rail 40 and the first cutout 35 of the lower rail 30. This releases the movement restriction of the upper rail 40. By operation on the rear side of the vehicle, the movement restriction of the upper rail 40 can be released. Therefore, the unlocking member 80 functions as a rear unlocking member.

The operation and effect of the present embodiment will be described.

(1) The unlocking member 80 is located inside the lock spring 50 in both the longitudinal direction and the width direction of the upper rail 40. Further, the second member 82 of the unlocking member 80 is made of one flat plate material, and has a rotating portion 82a that rotates and the pressing portions 82d that are connected to the rotating portion 82a and presses the lock spring 50.

The unlocking member 80 is located inside the lock spring 50 in both the longitudinal direction and the width direction of the upper rail 40. Thus, the space inside the lock spring 50 can be efficiently used. Therefore, the vehicle seat slide apparatus 10 can be downsized. Further, by utilizing the space in the longitudinal direction of the upper rail 40, it is possible to secure a wide movable range of the unlocking member 80. Therefore, operation feeling of the unlocking member 80 can be improved.

Further, the rotating portion 82a of the unlocking member 80 is made of one flat plate material. Thus, the thickness of the rotating portion 82a can be made thinner than that in a form including a rotating material, that is made of the plurality of stacked plate materials or the bent plate material. Therefore, since the rotating portion 82a is relatively thin, the space in the upper rail 40 can be efficiently used. Specifically, the region sandwiched between the pair of second extending portions 53 of the lock spring 50 can be efficiently used. Therefore, the vehicle seat slide apparatus 10 can be downsized.

(2) The rotating portion 82a and the pressing portions 82d of the vehicle seat slide apparatus 10 are made of the integrally molded product. Since the rotating portion 82a and the pressing portions 82d are made of the integrally molded product, there is no need to use another member to connect the rotating portion 82a and the pressing portions 82d. Further, the step of integrating the rotating portion 82a and the pressing portions 82d by welding or the like is unnecessary. Since no other member is used, the vehicle seat slide apparatus 10 can also be downsized. In addition, the rotating portion 82a and the pressing portions 82d can be easily connected to each other because they are made of the integrally molded product.

(3) In the vehicle seat slide apparatus 10, the pressing portions 82d are formed by the one bent plate material 86. Since the pressing portions 82d are formed by the one bent plate member 86, the pressing portions 82d can be efficiently formed. In addition, a position of the pressing portions 82d can be easily and accurately formed as compared with a form including the pressing portions 82d joined to the rotating portion 82a.

(4) The pressing portions 82d of the vehicle seat slide apparatus 10 project from both sides of the flat plate material in the thickness direction of the flat plate material forming the rotating portion 82a. Therefore, the load applied to the pressing portions 82d when the lock spring 50 is pressed can be more evenly transmitted to the rotating portion 82a. Therefore, rotation of the rotating portion 82a is more stable. In addition, there is no need to weld the plurality of stacked plate materials in order to manufacture the pressing portions 82d. This can suppress the distortion of the plate material due to the welding heat.

(5) The second member 82 of the unlocking member 80 has the stopper 82e. Since the stopper 82e contacts the first wall portion 91 of the reinforcing member 90, the rotating portion 82a can be restricted from rotating at a suitable position.

(6) In the second member 82 of the unlocking member 80, the first bent portion is located at the tip portion of the second member 82. Since the first bent portion is located at the tip portion of the second member 82, when the unlocking member 80 is used, the first projecting piece 86a and the second projecting piece 86b can be suppressed from being displaced in the width direction DX and a direction in which they are separated from each other. That is, it is possible to preferably maintain a caulked state of the first bent portion of the plate material 86.

(7) The unlocking member 80 is disposed across the lock spring 50 in the vertical direction of the upper rail 40. Therefore, it is possible to secure a wide movable range in the vertical direction of the unlocking member 80, which is necessary when the lock spring 50 is displaced. Therefore, the operation feeling of the unlocking member 80 can be improved.

(8) The unlocking member 80 is attached to the rear side of the curved portion 52 of the lock spring 50 in the vehicle front-rear direction. Therefore, the unlocking member 80 can efficiently operated behind the seat 2.

(9) In the lock spring 50, the first separated portions 51b of the first extending portions 51 and the second separated portions 53a of the second extending portions 53 are in point contact with the side wall portions 42 of the upper rail 40. Therefore, when the curved portion 52 of the lock spring 50 is displaced, the unlocking mechanism man stably bend the lock spring 50.

(10) The unlocking member 80 is attached to the reinforcing member 90. The reinforcing member 90 attached inside the upper rail 40 is utilized as a member to which the unlocking member 80 is attached. Thus, the internal space S2 of the upper rail 40 can be effectively used.

(11) The lock lever 60 is operated by the loop handle 70 operated in front of the upper rail 40. This can release the movement restriction of the upper rail 40. In addition to this, the movement restriction of the upper rail 40 can also be released by the unlocking member 80 operated behind the upper rail 40. Therefore, the movement restriction of the upper rail 40 can be efficiently released both in front of and behind the seat 2.

The present embodiment can be modified and implemented as follows. The present embodiment and the following modifications can be implemented in combination with each other within a technically consistent range.

In the present embodiment, the stopper 82e is configured to contact the first wall portion 91 of the reinforcing member 90 and restrict the rotation of the rotating portion 82a to a predetermined position. However, the present embodiment is not limited to this form. That is, the member which the stopper 82e contacts is not limited to the reinforcing member 90. For example, the stopper 82e may be configured to contact the upper rail 40 and restrict the rotation of the rotating portion 82a to the predetermined position.

Figure 11:
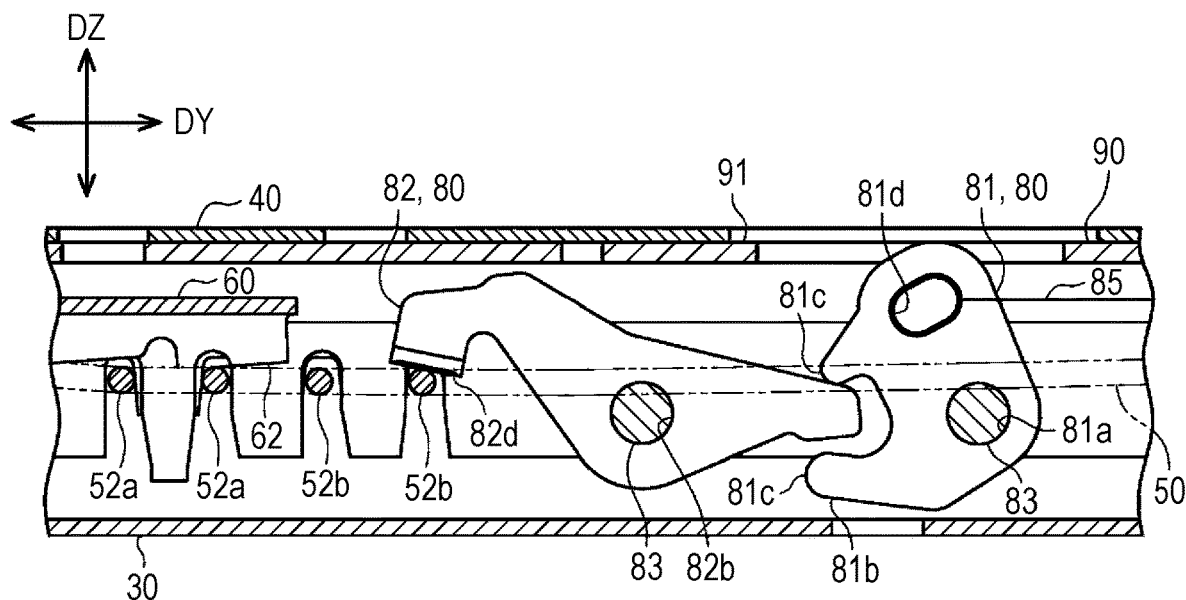
FIG. 11 is a side view of the unlocking member of a modification.

The other end of the first member 81 of the unlocking member 80 in the longitudinal direction does not have to project from the top wall portion 41 of the upper rail 40. The second member 82 of the unlocking member 80 may not have the stopper 82e. That is, the unlocking member 80 may be configured such that the entire unlocking member 80 is housed inside the upper rail 40. For example, as illustrated in FIG. 11, the entire first member 81 of the unlocking member 80 housed inside the upper rail 40 may be configured to be pulled by the wire 85 from the rear side. Even with such a configuration, the first member 81 of the unlocking member 80 can be displaced in the longitudinal direction of the upper rail 40 to improve the operation feeling of the unlocking member 80.

Figure 12:
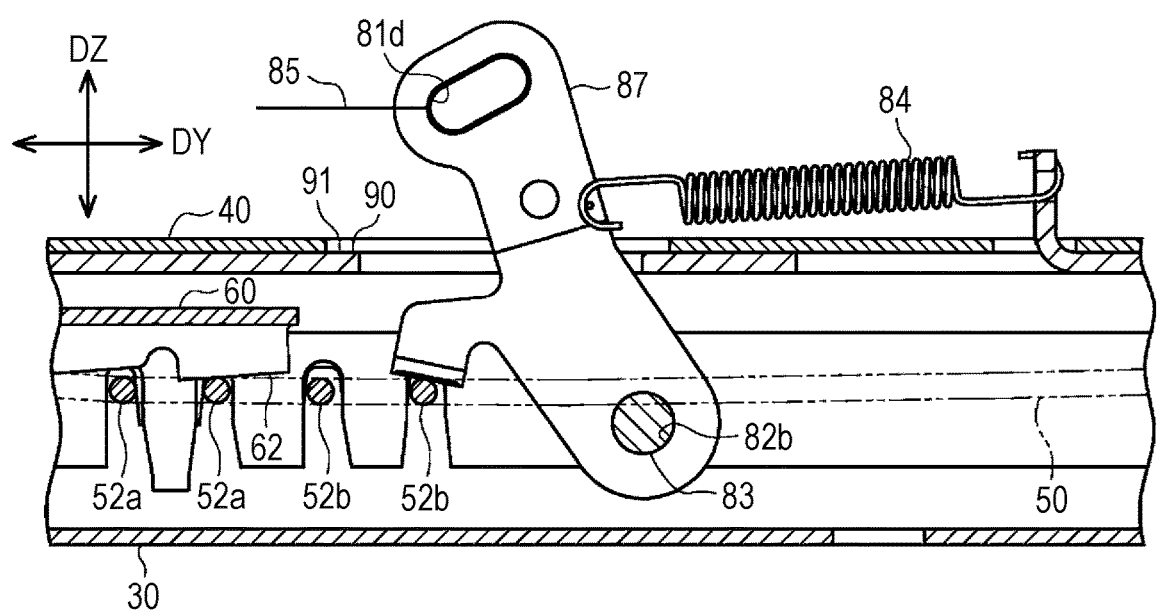
FIG. 12 is a side view of the unlocking member of the modification.
Figure 13:
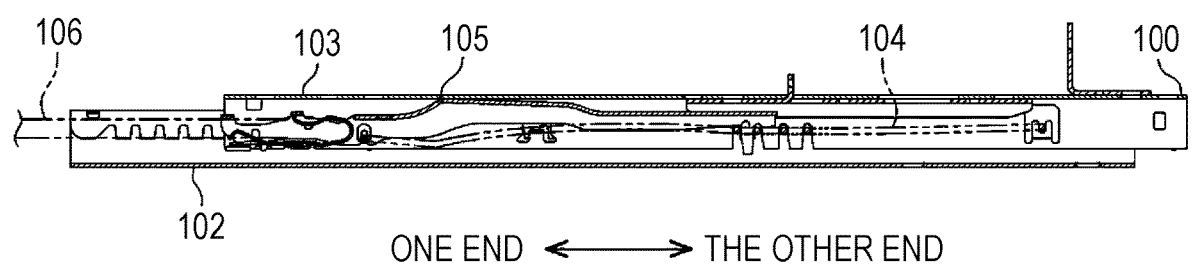
FIG. 13 is a side view of the vehicle seat slide apparatus.

The present embodiment is not limited to a form including the unlocking member 80 including the first member 81 and the second member 82. The unlocking member 80 may include one member. Or, the unlocking member 80 may include three or more members. As a form including the unlocking member 80 including one member, for example, as illustrated in FIG. 12, an unlocking member 87 may be used in which a portion that is rotated by being pulled by the wire 85 and is movable in the longitudinal direction of the upper rail 40 and a portion that displaces the curved portion 52 of the lock spring 50 are integrally formed. In this configuration, the other side of the unlocking member 87 in the longitudinal direction is pulled forward of the upper rail 40 in the front-rear direction DY. Thus, the curved portion 52 of the lock spring 50 may be displaced.

In the present embodiment, the rotating portion 82a, the pressing portions 82d, the stopper 82e, and the second engaging portion 82c are made of the integrally molded product. However, the present embodiment is not limited to this form. That is, the rotating portion 82a, the pressing portions 82d, the stopper 82e, and the second engaging portion 82c, which are molded as separate members, may be subsequently connected to form one member. For example, the pressing portions 82d, the stopper 82e, and the second engaging portion 82c may be joined to the rotating portion 82a made of one flat plate material. Examples of methods for joining the pressing portions 82d, the stopper 82e, and the second engaging portion 82c to the rotating portion 82a include welding and screwing.

In the present embodiment, the pressing portions 82d are manufactured by bending the one plate material 86. However, the present embodiment is not limited to this form. That is, a method for manufacturing the pressing portions 82d is not limited to bending of the plate material. For example, the pressing portions 82d may be manufactured by casting or forging.

In the present embodiment, the rotating portion 82a is configured such that the pressing portions 82d projecting on both sides in the thickness direction of the plate material from the flat plate material forming the rotating portion 82a have substantially the same projecting length. However, the present embodiment is not limited to this form. The pressing portions 82d projecting on both sides in the thickness direction of the plate material may have different projecting lengths.

A form of the pressing portions 82d is not limited to a form in which the pressing portions 82d projects in the thickness direction of the plate material forming the rotating portion 82a from both sides of the plate material. The form of the pressing portions 82d may be a form in which the pressing portion projects in the thickness direction of the plate material forming the rotating portion 82a from only one side of the plate material.

The unlocking member 80 may configured to be provided in front of the upper rail 40 and operated in front of the upper rail 40. That is, the vehicle seat slide apparatus 10 may not include the lock lever 60, in this case, the unlocking member 80 may release a lock instead of the lock lever 60. Further, in this case, unlocking members 80 may be provided at two positions in front of and behind the upper rail 40.

In a form including the unlocking member 80 disposed across the lock spring 50 in the vertical direction of the upper rail 40, the shaft hole 81a of the first member 81 and the shaft hole 82b of the second member 82 may be both arranged above the lock spring 50 in the vertical direction DZ.

The unlocking member 80 may not be disposed across the lock spring 50 in the vertical direction DZ of the upper rail 40. That is, the unlocking member 80 may be attached above the lock spring 50 in the vertical direction DZ of the upper rail 40.

The unlocking member 80 may be attached to other than the reinforcing member 90. The unlocking member 80 may be attached to a member attached inside the upper rail 40 separately from the reinforcing member 90. The unlocking member 80 may be attached to a member attached outside the upper rail 40. The unlocking member 80 may be configured to be directly attached to the upper rail 40.

A method for attaching the reinforcing member 90 to the upper rail 40 is not limited to welding and caulking. The reinforcing member 90 may be attached to the upper rail 40 with a screw. In the present embodiment, the lock spring 50 is formed in an open annular shape so that the gap is formed between the bent portions 51a. However, the present embodiment is not limited to this form. The lock spring 50 may be configured such that the bent portions 51a contact each other not to form the gap. The bent portions 51a, may be connected to each other to form a closed annular lock spring 50.

In the present embodiment, the longitudinal direction of the upper rail 40 and the lower rail 30 faces the front-rear direction DY of the vehicle. However, the present embodiment is not limited to this. The longitudinal direction of the upper rail 40 and the lower rail 30 may face the width direction DX of the vehicle.

Further, the vehicle seat slide apparatus according to the embodiment of the present disclosure may include: the lower rail; the upper rail that is movably mounted on the lower rail and supports the seat; the lock spring that is attached to the upper rail, has the lock portion that restricts the upper rail from moving by engaging with the lower rail, and is formed in an annular shape; and the unlocking member that is attached to the upper rail and releases the movement restriction of the upper rail by displacing the lock spring and releasing the engagement state between the lock spring and the lower rail. Here, the unlocking member is located inside the lock spring in both the longitudinal direction and the width direction of the upper rail, and has the rotating portion that is made of the one flat plate material and rotates and the pressing portion that is connected to the rotating portion and presses the lock spring.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A vehicle seat slide apparatus comprising:
   a lower rail;
   an upper rail movably mounted on the lower rail and configured to support a seat;
   a lock spring attached to the upper rail and formed in an elongated annular shape; and an unlocking member attached to the upper rail, wherein the lock spring has a lock portion configured to engage with the lower rail to restrict the upper rail from moving, the unlocking member is configured to release movement restriction of the upper rail by displacing the lock spring to release an engagement state between the lock spring and the lower rail, is disposed inside the lock spring in both a longitudinal direction and a width direction of the upper rail, and includes a rotating portion and a pressing portion, the rotating portion is made of one flat plate material, and is configured to rotate, and the pressing portion is configured to be connected to the rotating portion and press the lock spring.

2. The vehicle seat slide apparatus according to claim 1, wherein the rotating portion and the pressing portion are made of an integrally molded product.

3. The vehicle seat slide apparatus according to claim 1, wherein the pressing portion is made of one bent plate material.

4. The vehicle seat slide apparatus according to claim 3, wherein the rotating portion is made of a flat plate material, and the pressing portion projects from both sides of the flat plate material in a thickness direction of the flat plate material.

* * * * *